Patented Mar. 19, 1929.

1,705,948

UNITED STATES PATENT OFFICE.

MORRIS L. WEISS, OF NEWARK, NEW JERSEY, ASSIGNOR TO DOVAN CHEMICAL CORPORATION, OF NEW YORK, N. Y., A CORPORATION OF NEW YORK.

PROCESS FOR VULCANIZING RUBBER AND PRODUCTS OBTAINED THEREBY.

No Drawing.   Application filed July 25, 1925.   Serial No. 46,161.

This invention relates to processes for vulcanizing rubber and similar materials and to the products obtained thereby and is more particularly directed to acceleration of vulcanization by a class of substituted guanidines.

One of the objects of the invention is to provide a material which will efficiently accelerate vulcanization of rubber; to provide a simple process for the use of the material and to produce a series of useful vulcanized rubber products.

In accordance with my invention I have found that dimeta xylyl guanidine and similar substances are valuable accelerators of vulcanization.

This application is a continuation in part of my co-pending application Serial No. 490,746, filed August 8, 1921.

My invention accordingly comprises a process for accelerating the vulcanization of rubber which includes combining rubber with a substituted guanidine having an imid group and two substituting aryl groups, at least one of the aryl groups being disubstituted, e. g., dimeta xylyl guanidine and other substances which will be referred to hereinafter, and vulcanizing the rubber.

In carrying out the process in its preferred form I mix, preferably on the mixing mill in the usual manner, 100 pounds of first latex crepe rubber, 50 pounds of zinc oxide, 3 pounds of rubber and 0.75 pounds of dimeta xylyl guanidine. After milling is complete the mixture is placed in a mold and heated at 45 pounds per square inch steam pressure for forty-five minutes, at the end of which time satisfactory vulcanization has occurred.

I have found that the rubber vulcanized in this manner has a tensile strength of 3860 pounds per square inch and an elongated of 710 per cent.

The formula for dimeta xylyl guanidine is as follows:

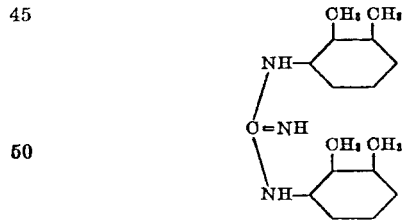

Other related substances which I have employed as accelerators have similar formulæ,
for example, dialpha naphthyl guanidine, a similar accelerator, has the formula

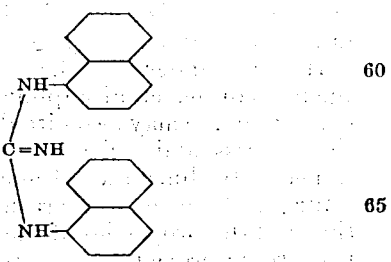

Phenyl xylyl guanidine, a similar accelerator, has the formula:

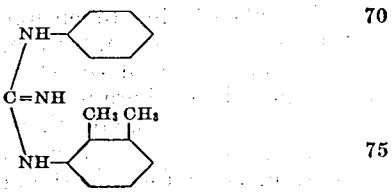

Alpha phenyl beta cumyl guanidine, a similar accelerator, has the formula.

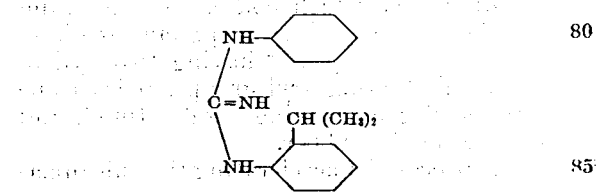

Di cumyl guanidine, a similar accelerator, has the formula:—

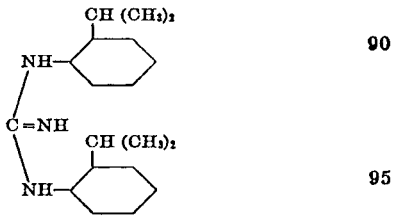

Alpha napthyl beta phenyl guanidine, a similar accelerator has the formula:

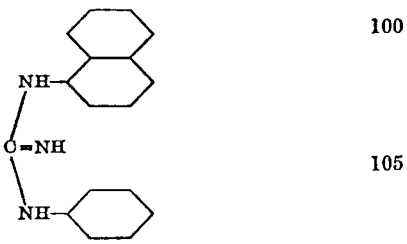

It will be observed from these formulas that in at least one of the substituting aryl groups in all instances, disubstitution occurs. This disubstitution may occur in the ring, such as in the case of dimeta xylyl guanidine, or may occur in the side chain such as dicumyl guanidine, and the expression "at least one of the substituting aryl groups being disubstituted" is intended to refer to either disubstitution in the ring or in the side chain. Each of the above accelerators may be substituted in place of dimeta xylyl guanidine in the example given. Upon treatment under the conditions there set forth, satisfactory vulcanization, similar to that obtained with dimeta xylyl guanidine, occurs.

It will be understood that other vulcanizing agents than elemental sulphur may be employed. Zinc oxide may be omitted in carrying out the process and vulcanization may be obtained with dimeta xylyl guanidine and sulphur, but both the acceleration of vulcanization and the properties of the resulting product are improved by the presence of zinc oxide or equivalent metallic compound.

As many apparently widely different embodiments of this invention may be made, I do not wish to be understood as being limited to the details of the steps of the process or compositions herein set forth for various changes may be made therein, without departing from the spirit and scope of my invention, as set forth in the appended claims.

What I claim is:

1. A process for accelerating the vulcanization of rubber which comprises combining the rubber with a substituted guanidine having an imid group and having two hydrocarbon substituting aryl groups, at least one of the aryl groups being disubstituted, and vulcanizing the rubber.

2. A process for accelerating the vulcanization of rubber which comprises combining the rubber with a disubstituted guanidine having an imid group and having two hydrocarbon substituting aryl groups, at least one of the aryl groups being disubstituted in the ring and vulcanizing the rubber.

3. A process for accelerating the vulcanization of rubber which comprises combining the rubber with a substitued guanidine having an imid group and having two hydrocarbon substituting aryl groups, at least one of the aryl groups being disubstituted, sulphur or an equivalent vulcanizing agent and zinc oxide or a similar substance of an equal valency, and vulcanizing the rubber.

4. As a new product, a vulcanized rubber derived from rubber combined with a substituted guanidine having an imid group and having two hydrocarbon substituting aryl groups, at least one of the aryl groups being disubstituted.

5. As a new product, a vulcanized rubber derived from rubber combined with a substituted guanidine having an imid group and having two hydrocarbon substituting aryl groups, at least one of the aryl groups being disubstituted in the ring.

6. A vulcanized rubber obtained from a rubber compound containing a substituted guanidine having an imid group and having two hydrocarbon substituting aryl groups, at least one of the aryl groups being disubstituted, sulphur or an equivalent vulcanizing agent and zinc oxide or a similar substance having an equal valency.

7. The process of vulcanizing rubber in the presence of a di xylyl guanidine.

Signed at New York, N. Y., this 23d day of July, 1925.

MORRIS L. WEISS.